2,591,643

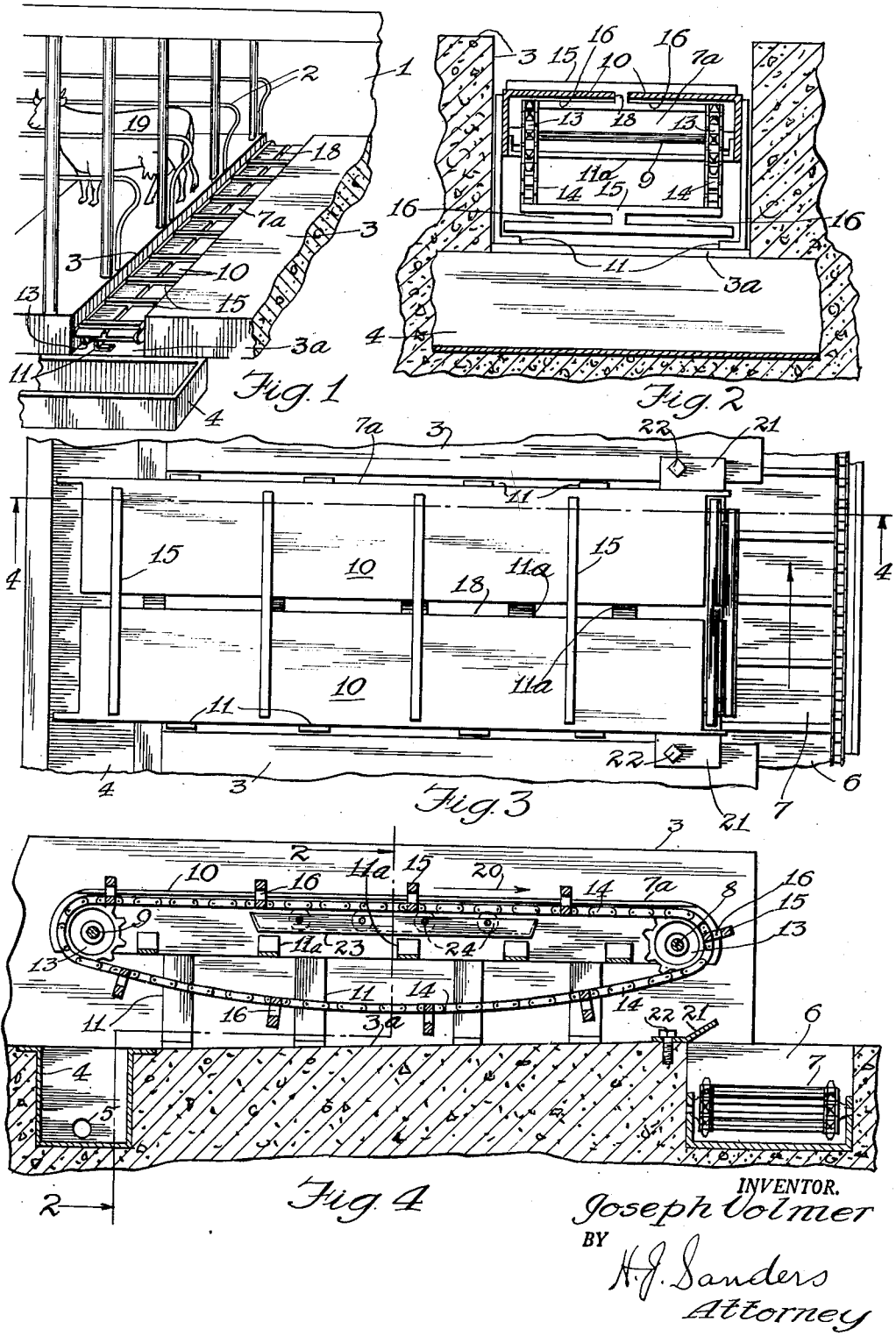
April 1, 1952  J. VOLMER  2,591,643
FERTILIZER SEPARATOR FOR BARNS AND LIKE STRUCTURES
Filed July 8, 1947
INVENTOR.
Joseph Volmer
BY
H. J. Sanders
Attorney Patented Apr. 1, 1952

UNITED STATES PATENT OFFICE 2,591,643

FERTILIZER SEPARATOR FOR BARNS AND LIKE STRUCTURES

Joseph Volmer, Huntley, Ill.

Application July 8, 1947, Serial No. 759,644

1 Claim. (Cl. 119—15)

This invention relates to improvements in fertilizer separators and more particularly to such separators for use in barns, stables and the like. One object is to provide a fertilizer separator that may be specified for installation in new barn or stable construction or built up in old structures. A further object is to provide a fertilizer separator that is positive and efficient in use, not difficult to build or install and that will more than likely pay for itself in a short time.

A still further object is to provide a fertilizer separator the use of which contributes materially to barn or stable sanitation, that is a time and labor saver, that is automatic in operation and of durable construction and not likely to get out of repair with ordinary use. A still further object is to provide a fertilizer separator that operates to store up fertilizer during the winter season for use on pastures at the time the grass begins its growth which is the period when such fertilizer is most needed.

Other objects, novel features and advantages of arrangement, construction and design comprehended by the invention are hereinafter fully pointed out or made apparent from the following description of a preferred embodiment as illustrated in the accompanying drawing wherein like reference characters denote corresponding parts throughout.

In the drawing:

Fig. 1 is a view in perspective of a portion of a barn or like structure illustrating the application of the instant fertilizer separator.

Fig. 2 is a vertical cross sectional view through the separator taken on the line 2—2 of Fig. 4.

Fig. 3 is a top plan view of Fig. 4, and,

Fig. 4 is a vertical cross sectional view taken on the line 4—4 of Fig. 3.

The reference numeral 1 denotes a portion of a cow barn divided conventionally into stalls 2 and having a cement, or the like floor 3. Extending transversely of the structure at a point adjacent the stalls is a trough 4 of suitable length imbedded in a channel 3a in floor 3 having a pitch in the direction of trough 4, the latter having an outlet 5 leading to a septic tank located at any convenient point within or outside the structure and adapted to receive liquid material. Arranged at the opposite end of the structure is a somewhat similar trough 6 substantially parallel to trough 4 and likewise imbedded in the floor channel. Within the trough 6 and extending longitudinally thereof is a conveyor 7 preferably motor driven adapted to receive non-liquid fertilizer, this conveyor extending through a wall of the structure and terminating at an elevation suitable to delivery of its material into a truck or manure spreader.

Extending from trough 4 to trough 6 is a longitudinally disposed conveyor 7a, the motor shaft 8 and support shaft 9 thereof operatively supported by sectional platform 10 arranged upon legs 11, the platform sections being connected by the braces 11a, said legs erected upon the inclined floor channel 3a, said shafts 8, 9 having fast thereupon the cog wheels 13 about which the chains 14 pass provided with cleats 15 transversely disposed, said cleats formed with longitudinal slots 16 to permit them to pass about and longitudinally of the platform sections which are separated by the space 18 from end to end. In operation the droppings from the animals 19 in the stalls fall upon the platform 10, the liquid passing through the space 18 upon the inclined floor of channel 3a and into the trough 4 from which it is pumped through opening 5 to the point of delivery, the solid material being removed by the cleats 15 and deposited upon the conveyor 7 which transports same to the desired delivery point.

While only the stalls upon one side of the barn or structure are shown if stalls are provided upon other sides they will be serviced by installations similar to that described. The several cleats 15 sweep the table surface of the platform 10 and deposit upon the conveyor 7, the movement of conveyor 7a being here in the direction denoted by arrow 20, Fig. 4. A guard 21 comprising an obliquely disposed upwardly extending lip and a base portion secured to the channel floor by fasteners 22 is provided beneath one end of the conveyor 7a along one side of trough 6 upon which any liquid material from conveyor 7a may be received at this point and be directed upon the channel floor into the trough 4. As the cleats of the conveyor 7a pass about the end thereof they move longitudinally of and slightly above channel floor 3a and sweep therefrom any material that may be in their path to trough 4. A box 23 carried by platform 10 carries rollers 24 freely engaging and supporting and lubricating the chains 14, said box containing lubricant.

What is claimed is:

In fertilizer separators for barns and like structures having an inclined floor with troughs at relatively high and low floor points; a sectional elevated platform arranged upon said floor with its ends adjacent said troughs, said platform sections spaced apart to permit passage of liquid fertilizer therebetween upon said floor, shafts at the ends of said platform, cog wheels upon said shafts, endless chains connecting said cog wheels, and cleats carried by said chains and extending transversely thereof, said cleats slotted to receive and travel along said platform contiguous to the upper surface thereof, said cleats as they pass below said platform moving in a direction from the higher to the relatively lower trough immediately above said inclined floor to remove material therefrom toward said lower trough.

JOSEPH VOLMER.

REFERENCES CITED

The following references are of record in the file of this patent:

UNITED STATES PATENTS

| Number | Name | Date |
| --- | --- | --- |
| 1,090,131 | Bowditch | Mar. 17, 1914 |
| 1,188,368 | Molins | June 20, 1916 |
| 1,274,219 | Ulbrecht | July 30, 1918 |
| 1,290,200 | Holmsted | Jan. 7, 1919 |